US012593386B2

(12) United States Patent
Lu et al.

(10) Patent No.: US 12,593,386 B2
(45) Date of Patent: Mar. 31, 2026

(54) LIGHTING SYSTEM HAVING LINKAGE-TYPE SENSING MECHANISM

(71) Applicant: Xiamen PVTECH Co., Ltd., Xiamen (CN)

(72) Inventors: Fuxing Lu, Xiamen (CN); Ronghui Wang, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 215 days.

(21) Appl. No.: 18/398,248

(22) Filed: Dec. 28, 2023

(65) Prior Publication Data

US 2024/0422881 A1       Dec. 19, 2024

(30) Foreign Application Priority Data

Jun. 16, 2023    (CN) .......................... 202310721750.7

(51) Int. Cl.
H05B 47/115       (2020.01)
H04Q 9/00       (2006.01)
H05B 47/19       (2020.01)

(52) U.S. Cl.
CPC ............. H05B 47/115 (2020.01); H04Q 9/00 (2013.01); H05B 47/19 (2020.01); H04Q 2209/43 (2013.01)

(58) Field of Classification Search
CPC .......... H05B 47/19–195; H05B 47/115; H05B 47/13; H05B 45/30; H04Q 9/00; H04Q 2209/43; Y02B 20/40
See application file for complete search history.

(56) References Cited

U.S. PATENT DOCUMENTS

| | | | |
|---|---|---|---|
| 2013/0342131 A1 | 12/2013 | Recker | |
| 2015/0092408 A1 | 4/2015 | Wallach | |
| 2015/0168931 A1 | 6/2015 | Jin | |
| 2015/0189725 A1 | 7/2015 | Karc | |
| 2015/0230323 A1* | 8/2015 | Steiner | H05B 47/19 315/155 |
| 2020/0375015 A1* | 11/2020 | Carrigan | H05B 47/1985 |
| 2021/0014952 A1* | 1/2021 | Ard | G08C 17/02 |

FOREIGN PATENT DOCUMENTS

EP          2 515 618 A1    10/2012

* cited by examiner

*Primary Examiner* — Renan Luque
(74) *Attorney, Agent, or Firm* — Bruce Stone LLP; Joseph A. Bruce

(57)          ABSTRACT
A high-compatibility dimmer circuit is provided, which includes an impedance inspection avoidance module, a dimming module. A lighting system having linkage-type sensing mechanism comprises a sentry device and a lighting device. The sentry device comprises a first wireless communication module and a first sensing module connected to each other. The lighting device comprising a light-emitting module and a second wireless communication module connected to each other.

8 Claims, 8 Drawing Sheets

LIGHTING SYSTEM HAVING LINKAGE-TYPE SENSING MECHANISM

BACKGROUND OF THE INVENTION

1. Field of the Invention

The present invention relates to a lighting system, in particular to a lighting system having linkage-type sensing mechanism.

2. Description of the Prior Art

With the advance of technology, there is an increasing demand for the functionality of lighting devices. Therefore, lighting devices with various sensing functions have been developed to meet the requirements of diverse applications. The lighting devices of currently available lighting systems provide various sensing functions. However, these lighting devices are ineffective in detecting objects located at the corners or turns of corridors within buildings. As a result, they cannot promptly activate to provide the lighting function in these target areas. Therefore, current lighting systems are still unable to provide users with a satisfactory user experience and cannot meet actual requirements.

SUMMARY OF THE INVENTION

One embodiment of the present invention provides a lighting system having linkage-type sensing mechanism includes a sentry device and a lighting device. The sentry device includes a first wireless communication module and a first sensing module connected to each other. The lighting device includes a light-emitting module and a second wireless communication module connected to each other. The first sensing module detects a target object and generates a first triggering signal. The first triggering signal is transmitted to the light-emitting module via the first wireless communication module and the second wireless communication module in order to turn on the light-emitting module.

In one embodiment, the first sensing module is a microwave sensor or an infrared sensor.

In one embodiment, the lighting device further includes a second sensing module connected to the second wireless communication module.

In one embodiment, the second sensing module detects the target object and generate a second triggering signal. The second triggering signal is transmitted to the light-emitting module via the second wireless communication module in order to turn on the light-emitting module.

In one embodiment, the second sensing module is a microwave sensor or an infrared sensor.

In one embodiment, the sentry module further includes a rotating module and a base. The first sensing module is disposed on the rotating module and the rotating module is disposed on the base. The rotating module adjusts the direction of the first sensing module.

In one embodiment, the light-emitting module is a light-emitting diode (LED) or a LED array.

In one embodiment, the first wireless communication module and the second wireless communication module are Bluetooth modules, WiFi modules. ZigBee modules or other similar components.

In one embodiment, the sentry module further includes a power source module connected to the first wireless communication module.

In one embodiment, the power source module is a rechargeable battery or a primary battery.

The lighting system having linkage-type sensing mechanism in accordance with the embodiments of the present invention may have the following advantages:

(1) In one embodiment of the present invention, the lighting system having linkage-type sensing mechanism includes a sentry device and a lighting device. The sentry device includes a first wireless communication module and a first sensing module connected to each other. The lighting device includes a light-emitting module and a second wireless communication module connected to each other. The first sensing module detects a target object and generates a first triggering signal. The first triggering signal is transmitted to the light-emitting module via the first wireless communication module and the second wireless communication module in order to turn on the light-emitting module. Therefore, the sentry device can be installed at any location, serving as a remote sensing point in order to provide the sentry-like monitoring function for lighting devices disposed at the corners or turns of the corridors in a building. In this way, the sentry device can promptly turn on the lighting device in order to provide the lighting function for the target area, so the lighting system can execute a linkage-type sensing mechanism. Consequently, the lighting system can provide the user with an excellent user experience so as to satisfy actual requirements.

(2) In one embodiment of the present invention, the sentry device can be disposed at a position away from the lighting device. Therefore, when the sentry device detects a target object, the sentry device can remotely control the lighting device in order to turn on the lighting device. In this way, the lighting device can be turned on before the target object enters the lighting range thereof so as to provide the lighting function on time. Thus, the lighting system can be more convenient in use.

(3) In one embodiment of the present invention, the lighting device further includes a second sensing module, which is connected to the second wireless communication module. When the second sensing module detects the target object, the second sensing module generates a second triggering signal. The second triggering signal is transmitted to the light-emitting module through the second wireless communication module so as to turn on the light-emitting module. Consequently, the lighting device can be directly triggered when the target object is detected in order to provide the lighting function for the target area. Accordingly, the functionality of the lighting system can be optimized so as to meet actual requirements.

(4) In one embodiment of the present invention, the sentry device further includes a rotating module and a base. The first sensing module is disposed on the rotating module, which is mounted on the base. The rotating module can adjust the direction of the first sensing module to alter the sensing range of the first sensing module. Therefore, the user can adjust the direction of the first sensing module via the rotating module in order to make sure that the sensing range of the first sensing module can match the environment where the sentry device is disposed, such that the sensing accuracy of the first sensing module can be enhanced.

Consequently, the lighting system provides the user with an excellent user experience so as to effectively meet actual requirements.

(5) In one embodiment of the present invention, the sentry device includes a control button, which can be used to control the sensitivity and/or detecting range of the first sensing module. The user can fine-tune the sensing range of the first sensing module by using the control button, such that the sensing range of the first sensing module can match the environment where the sentry device is disposed so as to enhance the sensing accuracy of the first sensing module. Accordingly, the lighting system can be more in application and more flexible in use.

(6) In one embodiment of the present invention, the design of the lighting system is simple, so the lighting system can achieve desired technical effects without significantly increasing the cost thereof. As a result, the lighting system can achieve high practicality and conform to the future development trend.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
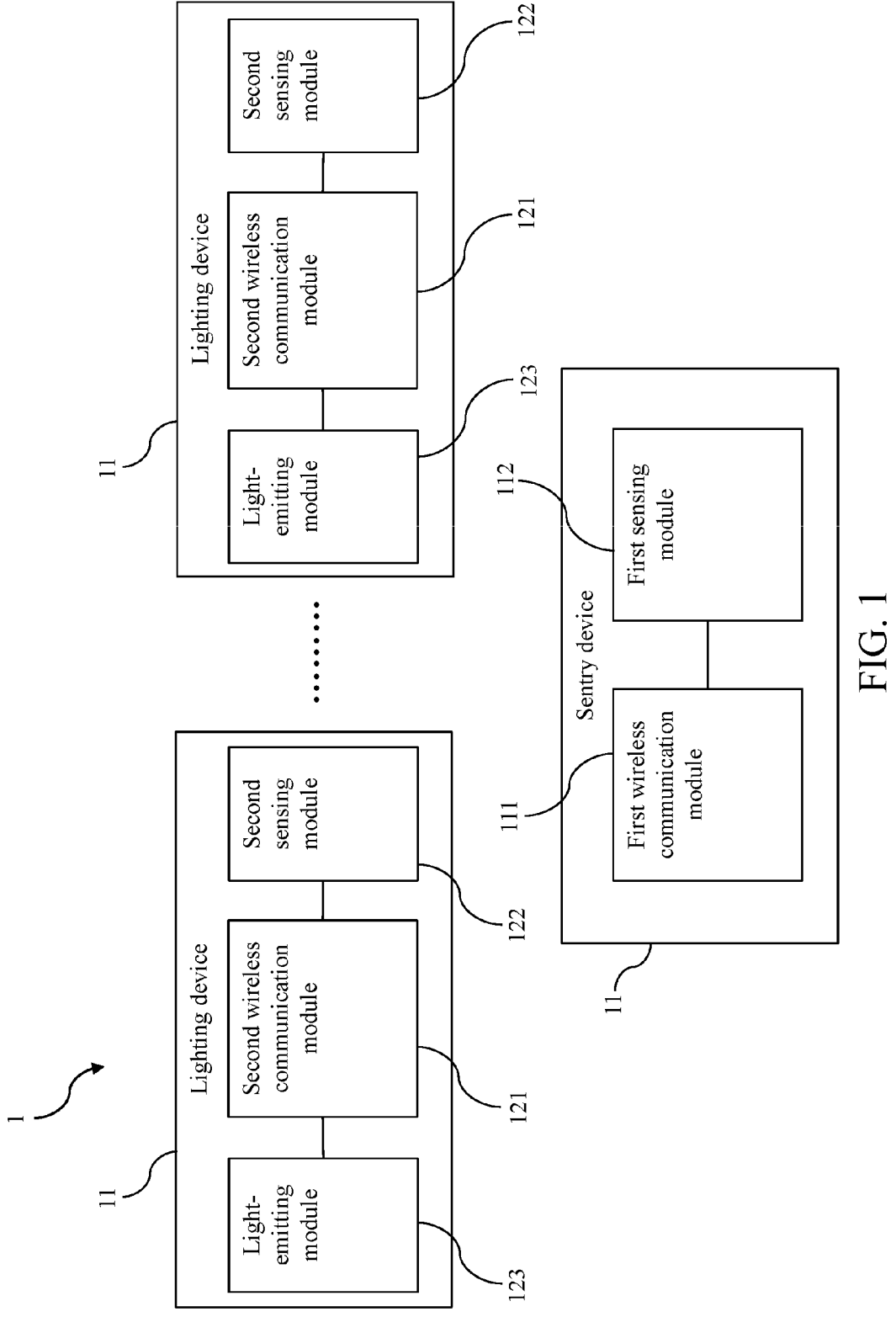
FIG. 1 is the block diagram of the lighting system having linkage-type sensing mechanism in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the block diagram of the lighting system having linkage-type sensing mechanism in accordance with one embodiment of the present invention. As shown in FIG. 1, the lighting system 1 includes at least one sentry device 11 and a plurality of lighting devices 12. The number of sentry devices 11 can be one or more. FIG. 1 only illustrates one sentry device 11 for explanatory purposes, and it does not imply that the number of sentry devices 11 is limited to one.

The sentry device 11 includes a first wireless communication module 111 and a first sensing module 112. The first wireless communication module 111 is connected to the first sensing module 112. The first sensing module 112 can detect moving targets (such as humans, animals, etc.). In one embodiment, the first sensing module 112 can be a microwave sensor, an infrared sensor, or similar components. In one embodiment, the first wireless communication module 111 can be a Bluetooth module, a WiFi module, a ZigBee module, or similar components.

The lighting device 12 includes a light-emitting module 123, a second wireless communication module 121, and a second sensing module 122. The second wireless communication module 121 is connected to the light-emitting module 123 and the second sensing module 122. The second sensing module 122 can detect moving targets. In one embodiment, the second sensing module 122 can be a microwave sensor, an infrared sensor, or similar components. In one embodiment, the light-emitting module 123 can be a Light-emitting diode (LED), a LED array, or similar components. In one embodiment, the second wireless communication module 121 can be a Bluetooth module, a WiFi module, a ZigBee module, or similar components.

The embodiment just exemplifies the present invention and is not intended to limit the scope of the present invention; any equivalent modification and variation according to the spirit of the present invention is to be also included within the scope of the following claims and their equivalents.

Figure 2:
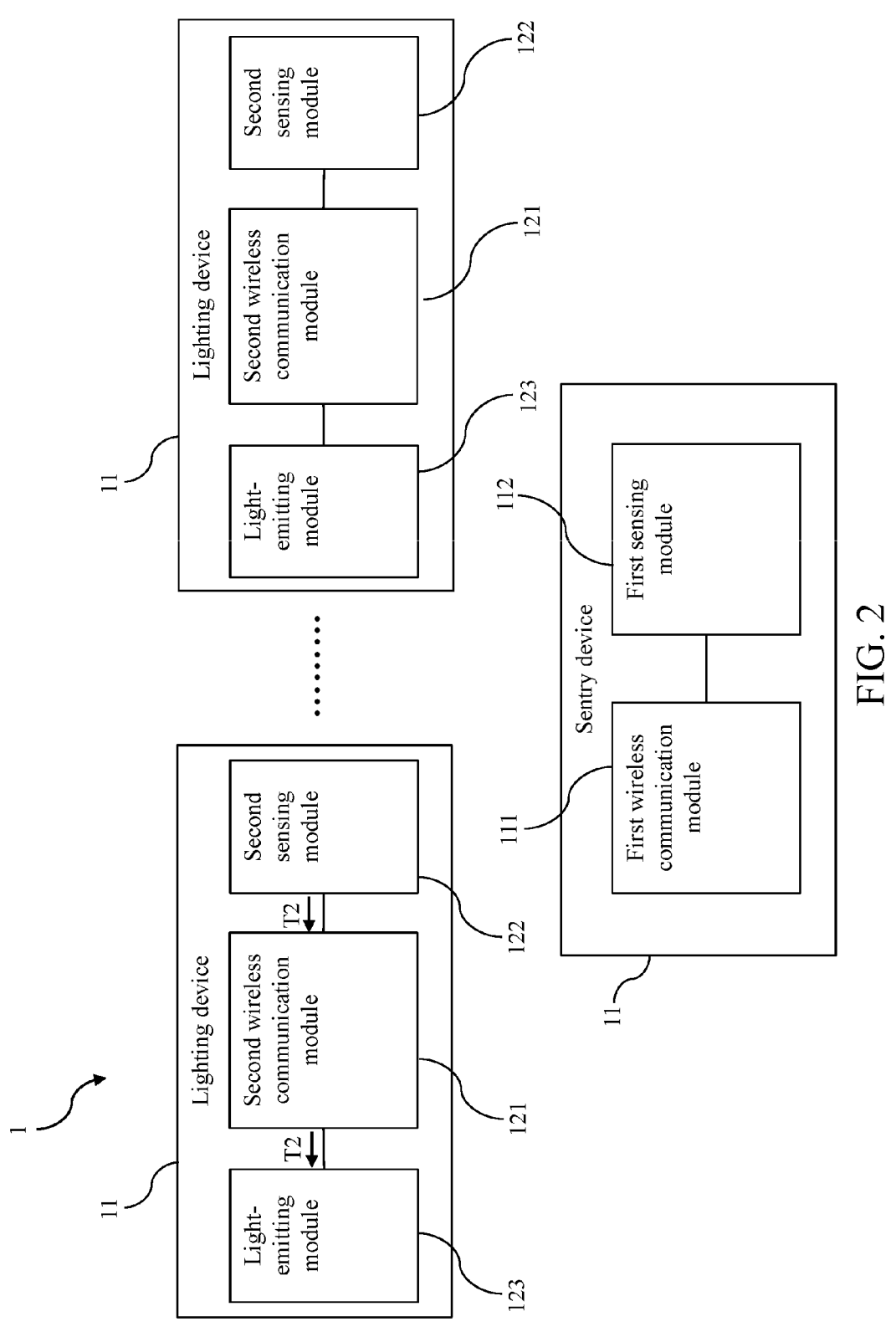
FIG. 2 is the schematic view of the first operational state of the lighting system having linkage-type sensing mechanism in accordance with one embodiment of the present invention.

Please refer to FIG. 2, which is the schematic view of the first operational state of the lighting system having linkage-type sensing mechanism in accordance with one embodiment of the present invention. As shown in FIG. 2, when the second sensing module 122 of any lighting device 12 detects a target object, this second sensing module 122 generates a second triggering signal T2. Then, the second sensing module 122 transmits the second triggering signal T2 to the light-emitting module 123 of this lighting device 12 via the second wireless communication module 121 of this lighting device 12 so as to turn on the light-emitting module 123.

Therefore, the lighting device 12 can provide the sensing function by itself and turn on the light-emitting module 123 thereof when detecting the target object so as to provide the lighting function for the target area. If this lighting device 12 is adjacent to another lighting device 12, this lighting device 12 can also transmit the second triggering signal T2 simultaneously to the adjacent lighting device 12 in order to turn on the adjacent lighting device 12.

The embodiment just exemplifies the present invention and is not intended to limit the scope of the present invention; any equivalent modification and variation according to the spirit of the present invention is to be also included within the scope of the following claims and their equivalents.

Figure 3:
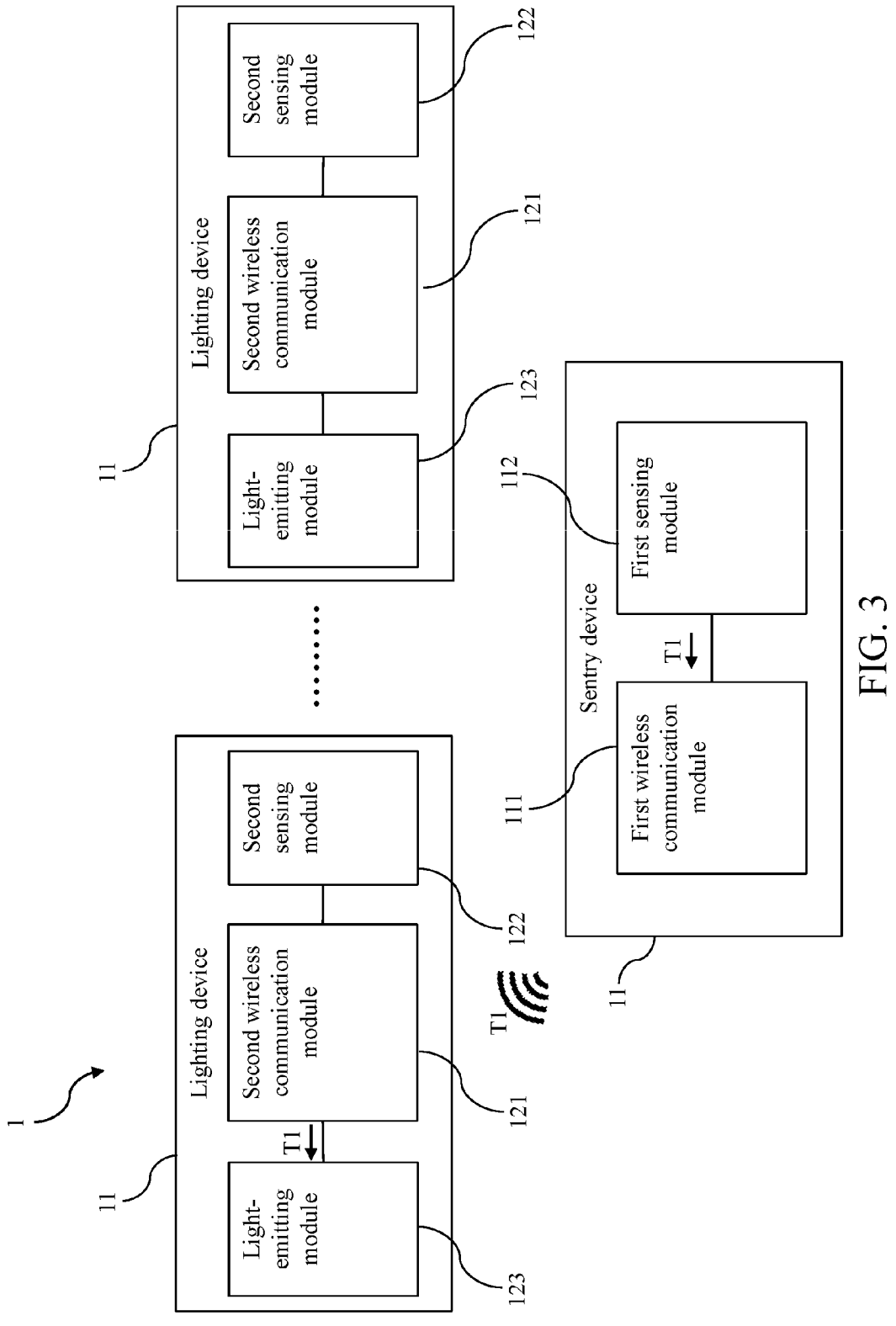
FIG. 3 is the schematic view of the second operational state of the lighting system having linkage-type sensing mechanism in accordance with one embodiment of the present invention.

Please refer to FIG. 3, which is the schematic view of the second operational state of the lighting system having linkage-type sensing mechanism in accordance with one embodiment of the present invention. As shown in FIG. 3, when the first sensing module 112 of the sentry device 11 detects the target object, the first sensing module 112 generates a first triggering signal T1. Then, the first sensing module 112 transmits the first triggering signal T1 to the second wireless communication module 121 of another lighting device 12 via the first wireless communication module 111 of the sentry device 11. Subsequently, the second wireless communication module 121 of this lighting device 12 transmits the first triggering signal T1 to the light-emitting module 123 in order to turn on the light-emitting module 123. Of course, the sentry device 11 can simultaneously trigger two or more lighting devices 12.

As previously stated, it can be understood that each lighting device 12 includes a second sensing module 122, and the second sensing module 122 is connected to the second wireless communication module 121. When the second sensing module 122 detects a target object, the second sensing module 122 generates a second triggering signal T2. The second triggering signal T2 is transmitted to the light-emitting module 123 via the second wireless communication module 121 so as to turn on the light-emitting module 123. Therefore, the lighting device 1 can be directly activated when the target object is detected so as to provide the lighting function for the target area. Thus, the functionality of the lighting system 1 can be further optimized and conform to actual requirements.

Therefore, the sentry device 11 can be installed at any location to serve as a remote sensing point so as to provide the sentry-like monitoring function for the lighting devices 12 disposed at the corners or turns in the corridors of a building. In this way, the sentry device 11 can promptly turn on the lighting devices 12 to provide the lighting function for the target area, so the lighting system 1 can execute a linkage-type sensing mechanism. Therefore, the lighting system 1 can provide the user with a great user experience and effectively meet actual requirements.

The embodiment just exemplifies the present invention and is not intended to limit the scope of the present invention; any equivalent modification and variation according to the spirit of the present invention is to be also included within the scope of the following claims and their equivalents.

Figure 4:
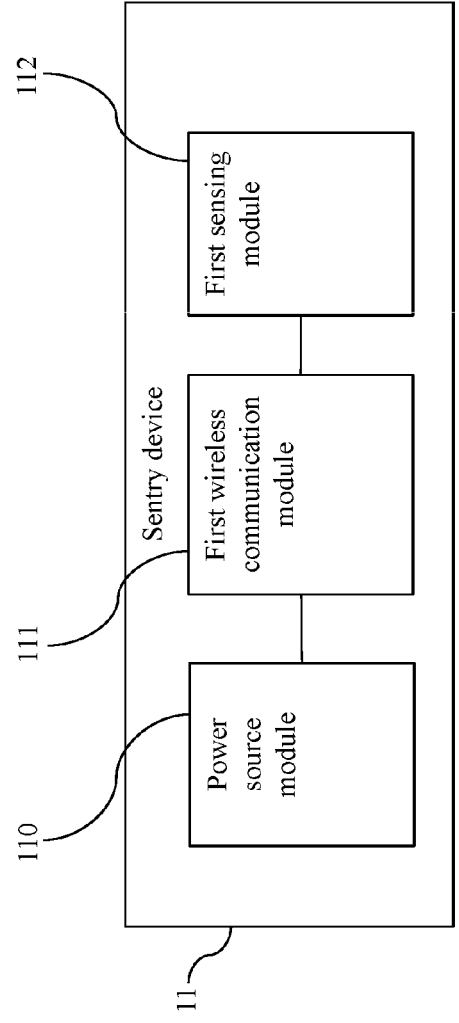
FIG. 4 is the block diagram of the sentry device of the lighting system having linkage-type sensing mechanism in accordance with one embodiment of the present invention.

Please refer to FIG. 4, which is the block diagram of the sentry device of the lighting system having linkage-type sensing mechanism in accordance with one embodiment of the present invention. As shown in FIG. 4, the sentry device 11 also includes a power source module 110. The power source module 110 is connected to the first wireless communication module 111 to power the first wireless communication module 111 and the first sensing module 112. In one embodiment, the power source module 110 can be a rechargeable battery (such as a lithium battery, a NiCd battery, a NiMH battery) or various primary batteries.

The embodiment just exemplifies the present invention and is not intended to limit the scope of the present invention; any equivalent modification and variation according to the spirit of the present invention is to be also included within the scope of the following claims and their equivalents.

Figure 5:
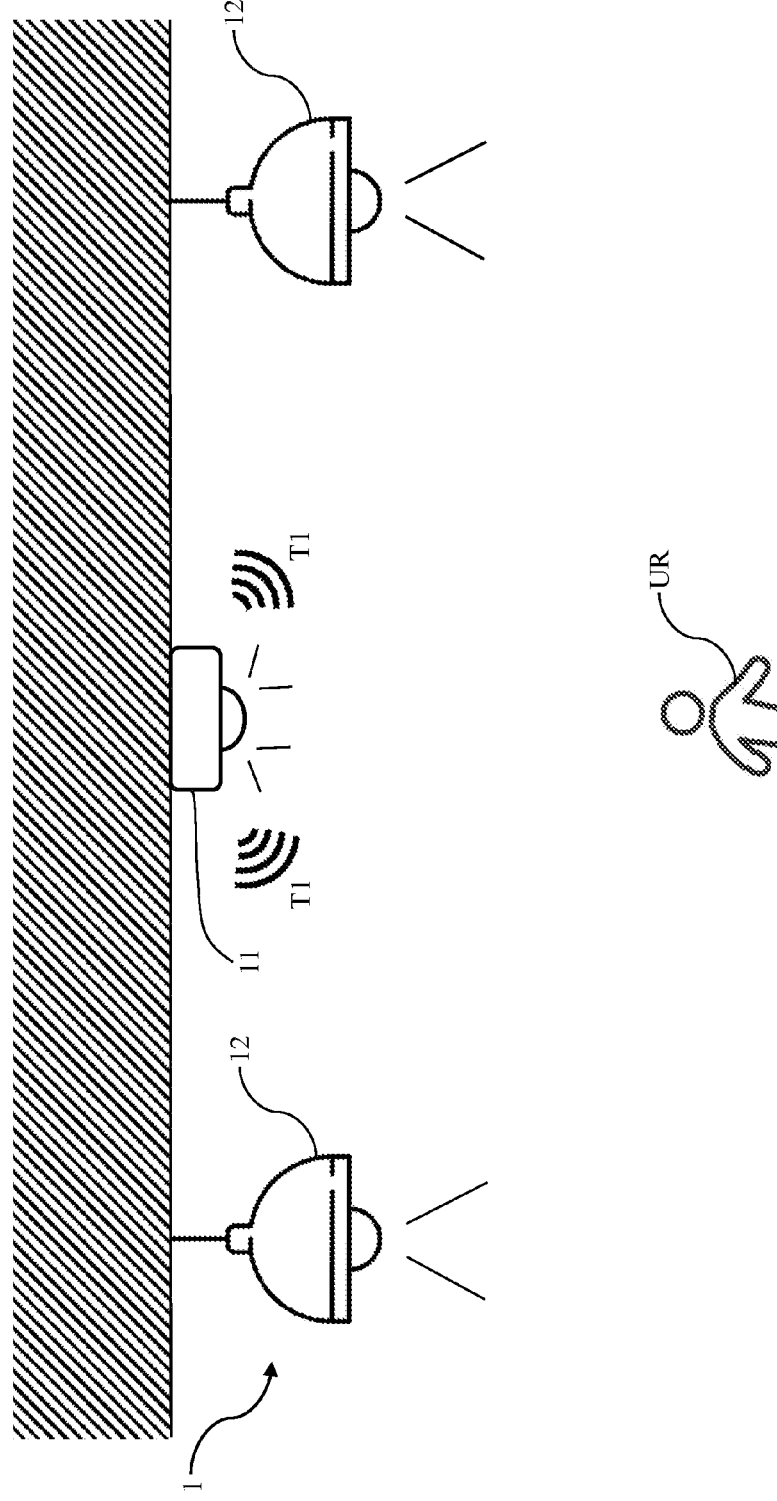
FIG. 5 is the schematic view of the first usage situation of the lighting system having linkage-type sensing mechanism in accordance with one embodiment of the present invention.

Please refer to FIG. 5, which is the schematic view of the first usage situation of the lighting system having linkage-type sensing mechanism in accordance with one embodiment of the present invention. As shown in FIG. 5, the sentry device 11 and two lighting devices 12 can be grouped together through a wireless mesh communication module (such as a Bluetooth mesh module), such that the sentry device 11 and these lighting devices 12 can communicate with each other (the number of sentry devices 11 can be one or more, and the number of lighting devices 12 can also be one or more).

When the two lighting devices 12 are disposed at the corners or turns in the corridors of a building, these lighting devices 12 cannot communicate with each other. Therefore, the sentry device 11 can be disposed between these two lighting devices 12. As set forth above, when the sentry device 11 detects a target object UR, the sentry device 11 generates a first triggering signal T1. Then, the sentry device 11 transmits the first triggering signal T1 to the above two lighting devices 12 with a view to turning on these lighting devices 12.

When the distance between the above two lighting devices 12 is far, they cannot communicate with each other. Therefore, the sentry device 11 can be disposed between these two lighting devices 12. Similarly, when the sentry device 11 detects the target object UR, the sentry device 11 generates the first triggering signal T1. Then, the sentry device 11 transmits the first triggering signal T1 to the above two lighting devices 12 in order to turn on these lighting devices 12.

The embodiment just exemplifies the present invention and is not intended to limit the scope of the present invention; any equivalent modification and variation according to the spirit of the present invention is to be also included within the scope of the following claims and their equivalents.

Figure 6:
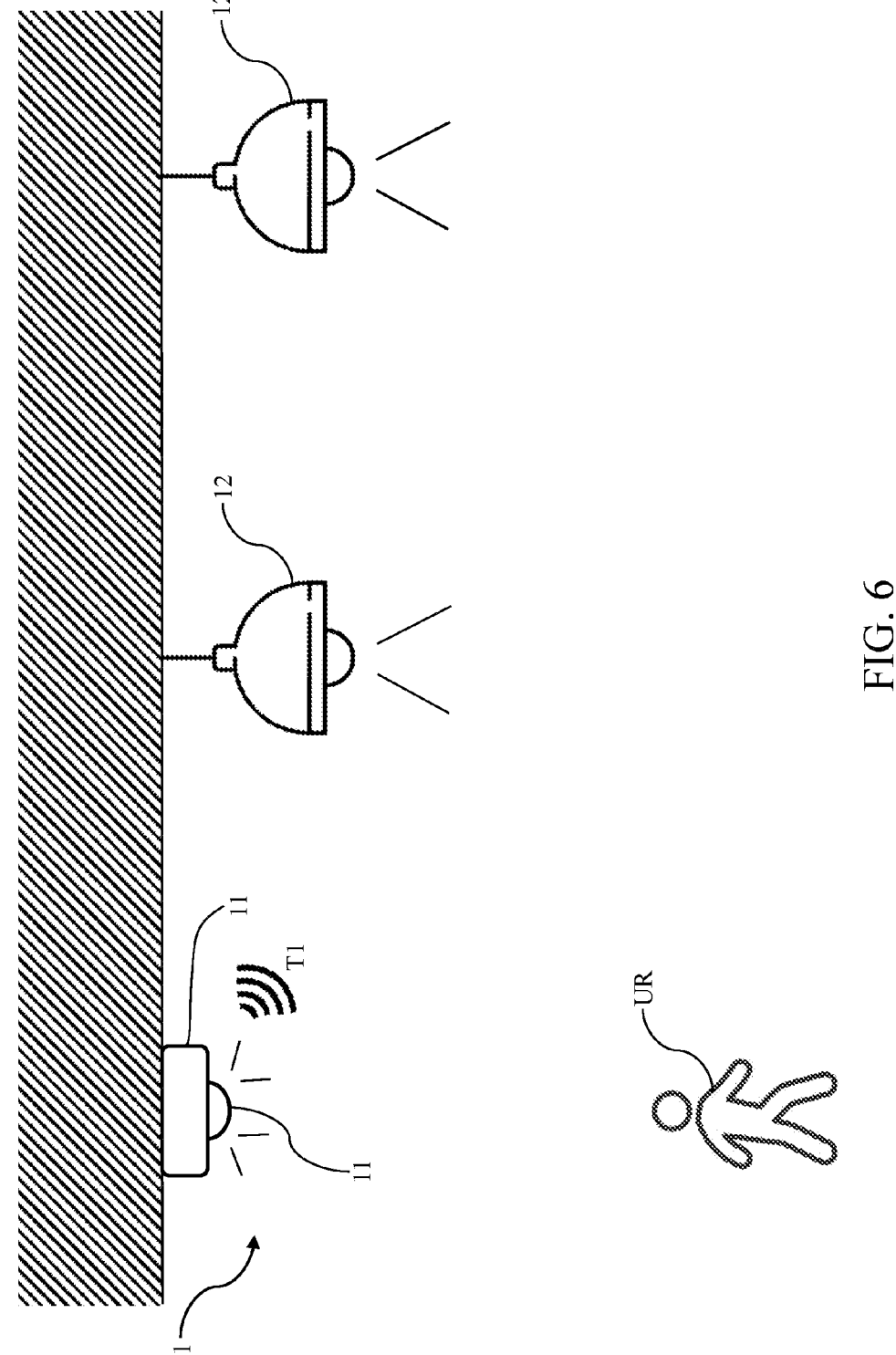
FIG. 6 is the schematic view of the second usage situation of the lighting system having linkage-type sensing mechanism in accordance with one embodiment of the present invention.

Please refer to FIG. 6, which is the schematic view of the second usage situation of the lighting system having linkage-type sensing mechanism in accordance with one embodiment of the present invention. As shown in FIG. 6, the sentry device 11 can be disposed in a location away from the above two lighting devices 12.

Therefore, when the target object UR approaches the sentry device 11, the sentry device 11 can detect the target object UR and generate a first triggering signal T1. Then, the sentry device 11 transmits the first triggering signal T1 to the above-mentioned two lighting devices 12. In this way, the above two lighting devices 12 can be turned on before the target object UR reaches the positions thereof.

As described above, it can be seen that the sentry device 11 can be installed in any location to serve as a remote sensing point in order to provide the sentry-line monitoring function for the lighting devices 12 disposed at the corners or turns in the corridors of a building. Thus, the sentry device 11 can timely turn on the lighting devices 12 to provide the lighting function for the target area. In this way, the lighting system 1 can execute a linkage-type sensing mechanism. Therefore, the lighting system 1 can provide the user with a good user experience in order to effectively satisfy actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that the lighting devices of currently available lighting systems provide various sensing functions. However, these lighting devices are ineffective in detecting objects located at the corners or turns of corridors within buildings. As a result, they cannot promptly activate to provide the lighting function in these target areas. Therefore, current lighting systems are still unable to provide users with a satisfactory user experience and cannot meet actual requirements. On the contrary, according to one embodiment of the present invention, the lighting system having linkage-type sensing mechanism includes a sentry device and a lighting device. The sentry device includes a first wireless communication module and a first sensing module connected to each other. The lighting device includes a light-emitting module and a second wireless communication module connected to each other. The first sensing module detects a target object and generates a first triggering signal. The first triggering signal is transmitted to the light-emitting module via the first wireless communication module and the second wireless communication module in order to turn on the light-emitting module. Therefore, the sentry device can be installed at any location, serving as a remote sensing point in order to provide the sentry-like monitoring function for lighting devices disposed at the corners or turns of the corridors in a building. In this way, the sentry device can promptly turn on the lighting device in order to provide the lighting function for the target area, so the lighting system can execute a linkage-type sensing mechanism. Consequently, the lighting system can provide the user with an excellent user experience so as to satisfy actual requirements.

According to one embodiment of the present invention, the sentry device can be disposed at a position away from the lighting device. Therefore, when the sentry device detects a target object, the sentry device can remotely control the lighting device in order to turn on the lighting device. In this way, the lighting device can be turned on before the target object enters the lighting range thereof so as to provide the lighting function on time. Thus, the lighting system can be more convenient in use.

Also, according to one embodiment of the present invention, the lighting device further includes a second sensing module, which is connected to the second wireless communication module. When the second sensing module detects the target object, the second sensing module generates a second triggering signal. The second triggering signal is transmitted to the light-emitting module through the second wireless communication module so as to turn on the light-emitting module. Consequently, the lighting device can be directly triggered when the target object is detected in order to provide the lighting function for the target area. Accordingly, the functionality of the lighting system can be optimized so as to meet actual requirements.

Further, according to one embodiment of the present invention, the sentry device further includes a rotating module and a base. The first sensing module is disposed on the rotating module, which is mounted on the base. The rotating module can adjust the direction of the first sensing module to alter the sensing range of the first sensing module. Therefore, the user can adjust the direction of the first sensing module via the rotating module in order to make sure that the sensing range of the first sensing module can match the environment where the sentry device is disposed, such that the sensing accuracy of the first sensing module can be enhanced. Consequently, the lighting system provides the user with an excellent user experience so as to effectively meet actual requirements.

Moreover, according to one embodiment of the present invention, the sentry device includes a control button, which can be used to control the sensitivity and/or detecting range of the first sensing module. The user can fine-tune the sensing range of the first sensing module by using the control button, such that the sensing range of the first sensing module can match the environment where the sentry device is disposed so as to enhance the sensing accuracy of the first sensing module. Accordingly, the lighting system can be more in application and more flexible in use.

Furthermore, according to one embodiment of the present invention, the design of the lighting system is simple, so the lighting system can achieve desired technical effects without significantly increasing the cost thereof. As a result, the lighting system can achieve high practicality and conform to the future development trend.

Figure 7:
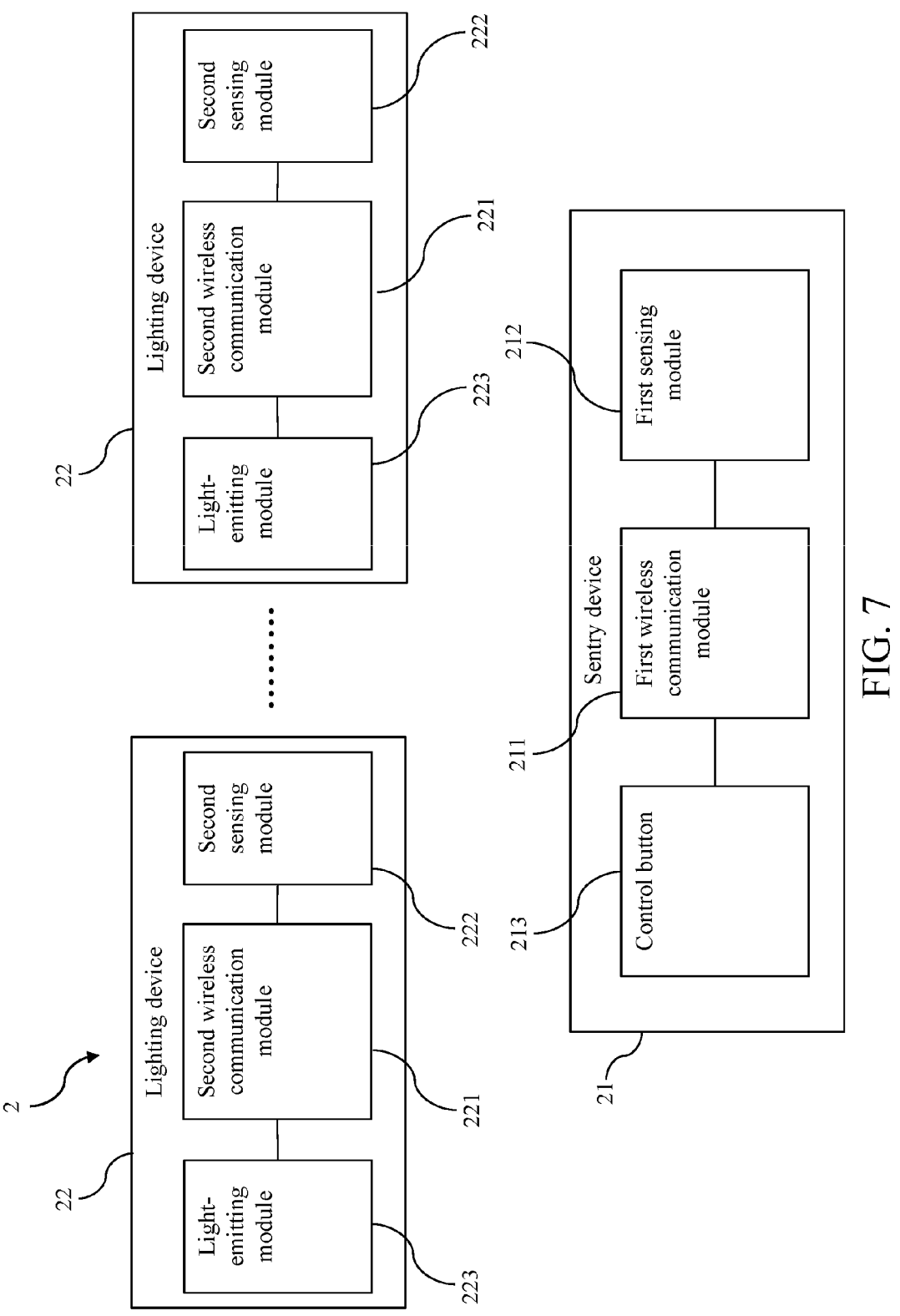
FIG. 7 is the block diagram of the lighting system having linkage-type sensing mechanism in accordance with another embodiment of the present invention.

Please refer to FIG. 7, which is the block diagram of the lighting system having linkage-type sensing mechanism in accordance with another embodiment of the present invention. As shown in FIG. 7, the lighting system 2 includes at least one sentry device 21 and a plurality of lighting devices 22. The number of sentry devices 21 can be one or more. FIG. 7 only illustrates one sentry device 21 for illustrative purposes, but it does not mean that the number of sentry devices 21 is limited to one.

The sentry device 21 includes a first wireless communication module 211 and a first sensing module 212. The first wireless communication module 211 is connected to the first sensing module 212. The first sensing module 212 can detect moving targets.

The lighting device 22 includes a light-emitting module 223, a second wireless communication module 221, and a second sensing module 222. The second wireless communication module 221 is connected to the light-emitting module 223 and the second sensing module 222. The second sensing module 222 can detect moving targets.

Similarly, the sentry device 21 can be installed at any location to serve as a remote sensing point in order to provide the sentry-line monitoring function for the lighting devices 22 disposed at the corners or turns in the corridors of a building. Thus, the sentry device 21 can timely turn on the lighting devices 22 to provide the lighting function for the target area. In this way, the lighting system 2 can execute a linkage-type sensing mechanism. Therefore, the lighting system 2 can provide the user with a good user experience so as to effectively meet actual requirements.

The above elements are similar to those of the previous embodiments, so will not be described herein again. The difference between this embodiment and the previous embodiment is that the sentry device 21 further includes a control button 213. The control button 213 is connected to the first sensing module 212 and can be used to control the sensitivity and/or detecting range of the first sensing module 212. In this way, the user can further fine-tune the detecting range of the first sensing module 212 through the control button 213, such that the sensing range of the first sensing module 212 can be more suitable for the environment where the sentry module 21 is disposed so as to further improve the detecting accuracy. Therefore, the lighting system 2 can be more comprehensive in application and more flexible in use.

The embodiment just exemplifies the present invention and is not intended to limit the scope of the present invention; any equivalent modification and variation according to the spirit of the present invention is to be also included within the scope of the following claims and their equivalents.

Figure 8:
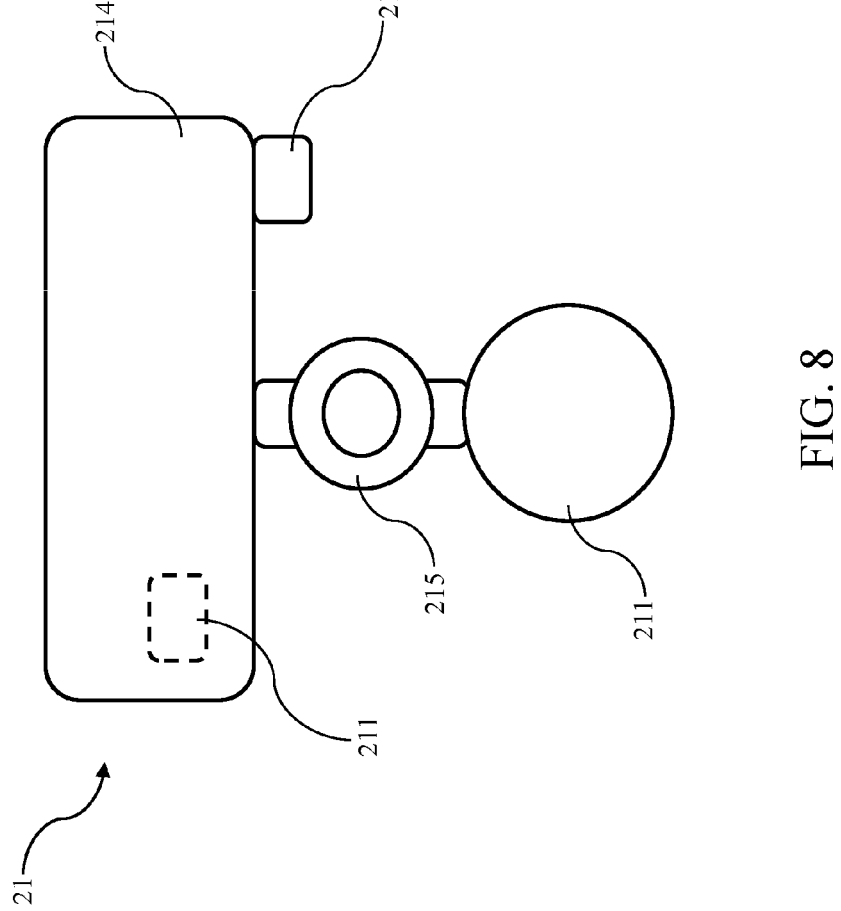
FIG. 8 is the block diagram of the sentry device of the lighting system having linkage-type sensing mechanism in accordance with another embodiment of the present invention.

Please refer to FIG. 8, which is the block diagram of the sentry device of the lighting system having linkage-type sensing mechanism in accordance with another embodiment of the present invention. As shown in FIG. 8, the sentry device 21 includes a first wireless communication module 211, a first sensing module 212, and a control button 213. Additionally, the sentry device 21 further includes a rotating module 215 and a base 214. The control button 213 can be disposed on the base 214, while the first wireless communication module 211 can be disposed inside the base 214. The first sensing module 212 is disposed on the rotating module 215 and the rotating module 215 is disposed on the base 214. The rotating module 215 is used to adjust the direction of the first sensing module 212. In one embodiment, the rotating module 215 can be a gear rotation mechanism, a universal joint holder, or similar components.

The rotating module 215 can be used to adjust the direction of the first sensing module 212 so as to change the detection range of the first sensing module 212. Consequently, the user can adjust the direction of the first sensing module 212 through the rotating module 215 so as to make the detecting range of the first sensing module 212 more suitable for the environment where the sentry device 21 is disposed so as to enhance the detecting accuracy. Therefore, the lighting system 2 can provide the user with a good user experience so as to effectively meet actual requirements.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting system having linkage-type sensing mechanism includes a sentry device and a lighting device. The sentry device includes a first wireless communication module and a first sensing module connected to each other. The lighting device includes a light-emitting module and a second wireless communication module connected to each other. The first sensing module detects a target object and generates a first triggering signal. The first triggering signal is transmitted to the light-emitting module via the first wireless communication module and the second wireless communication module in order to turn on the light-emitting module. Therefore, the sentry device can be installed at any location, serving as a remote sensing point in order to provide the sentry-like monitoring function for lighting devices disposed at the corners or turns of the corridors in a building. In this way, the sentry device can promptly turn on the lighting device in order to provide the lighting function for the target area, so the lighting system can execute a linkage-type sensing mechanism. Consequently, the lighting system can provide the user with an excellent user experience so as to satisfy actual requirements.

According to one embodiment of the present invention, the sentry device can be disposed at a position away from the lighting device. Therefore, when the sentry device detects a target object, the sentry device can remotely control the lighting device in order to turn on the lighting device. In this way, the lighting device can be turned on before the target object enters the lighting range thereof so as to provide the lighting function on time. Thus, the lighting system can be more convenient in use.

Also, according to one embodiment of the present invention, the lighting device further includes a second sensing module, which is connected to the second wireless communication module. When the second sensing module detects the target object, the second sensing module generates a second triggering signal. The second triggering signal is transmitted to the light-emitting module through the second wireless communication module so as to turn on the light-emitting module. Consequently, the lighting device can be directly triggered when the target object is detected in order to provide the lighting function for the target area. Accordingly, the functionality of the lighting system can be optimized so as to meet actual requirements.

Further, according to one embodiment of the present invention, the sentry device further includes a rotating module and a base. The first sensing module is disposed on the rotating module, which is mounted on the base. The rotating module can adjust the direction of the first sensing module to alter the sensing range of the first sensing module. Therefore, the user can adjust the direction of the first sensing module via the rotating module in order to make sure that the sensing range of the first sensing module can match the environment where the sentry device is disposed, such that the sensing accuracy of the first sensing module can be enhanced. Consequently, the lighting system provides the user with an excellent user experience so as to effectively meet actual requirements.

Moreover, according to one embodiment of the present invention, the sentry device includes a control button, which can be used to control the sensitivity and/or detecting range of the first sensing module. The user can fine-tune the sensing range of the first sensing module by using the control button, such that the sensing range of the first sensing module can match the environment where the sentry device is disposed so as to enhance the sensing accuracy of the first sensing module. Accordingly, the lighting system can be more in application and more flexible in use.

Furthermore, according to one embodiment of the present invention, the design of the lighting system is simple, so the lighting system can achieve desired technical effects without significantly increasing the cost thereof. As a result, the lighting system can achieve high practicality and conform to the future development trend.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting system having linkage-type sensing mechanism, comprising:

a sentry device comprising a first wireless communication module and a first sensing module connected to each other; and a lighting device comprising a light-emitting module, a second wireless communication module and a second sensing module, wherein the second wireless communication module is connected to the light-emitting module, and the second sensing module is connected to the second wireless communication module;

wherein the first sensing module is configured to detect a target object and generate a first triggering signal, and the first triggering signal is transmitted to the light-emitting module via the first wireless communication module and the second wireless communication module in order to turn on the light-emitting module, wherein the second sensing module is configured to detect the target object and generate a second triggering signal, and the second triggering signal is transmitted to the light-emitting module via the second wireless communication module in order to turn on the light-emitting module.

2. The lighting system having linkage-type sensing mechanism as claimed in claim 1, wherein the first sensing module is a microwave sensor or an infrared sensor.

3. The lighting system having linkage-type sensing mechanism as claimed in claim 1, wherein the second sensing module is a microwave sensor or an infrared sensor.

4. The lighting system having linkage-type sensing mechanism as claimed in claim 1, wherein the sentry module further comprises a rotating module and a base, wherein the first sensing module is disposed on the rotating module and the rotating module is disposed on the base, wherein the rotating module is configured to adjust a direction of the first sensing module.

5. The lighting system having linkage-type sensing mechanism as claimed in claim 1, wherein the light-emitting module is a light-emitting diode or a light-emitting diode array.

6. The lighting system having linkage-type sensing mechanism as claimed in claim 1, wherein the first wireless communication module and the second wireless communication module are Bluetooth modules, WiFi modules or ZigBee modules.

7. The lighting system having linkage-type sensing mechanism as claimed in claim 1, wherein the sentry module further comprises a power source module connected to the first wireless communication module.

8. The lighting system having linkage-type sensing mechanism as claimed in claim 7, wherein the power source module is a rechargeable battery or a primary battery.

* * * * *